Figure 3:
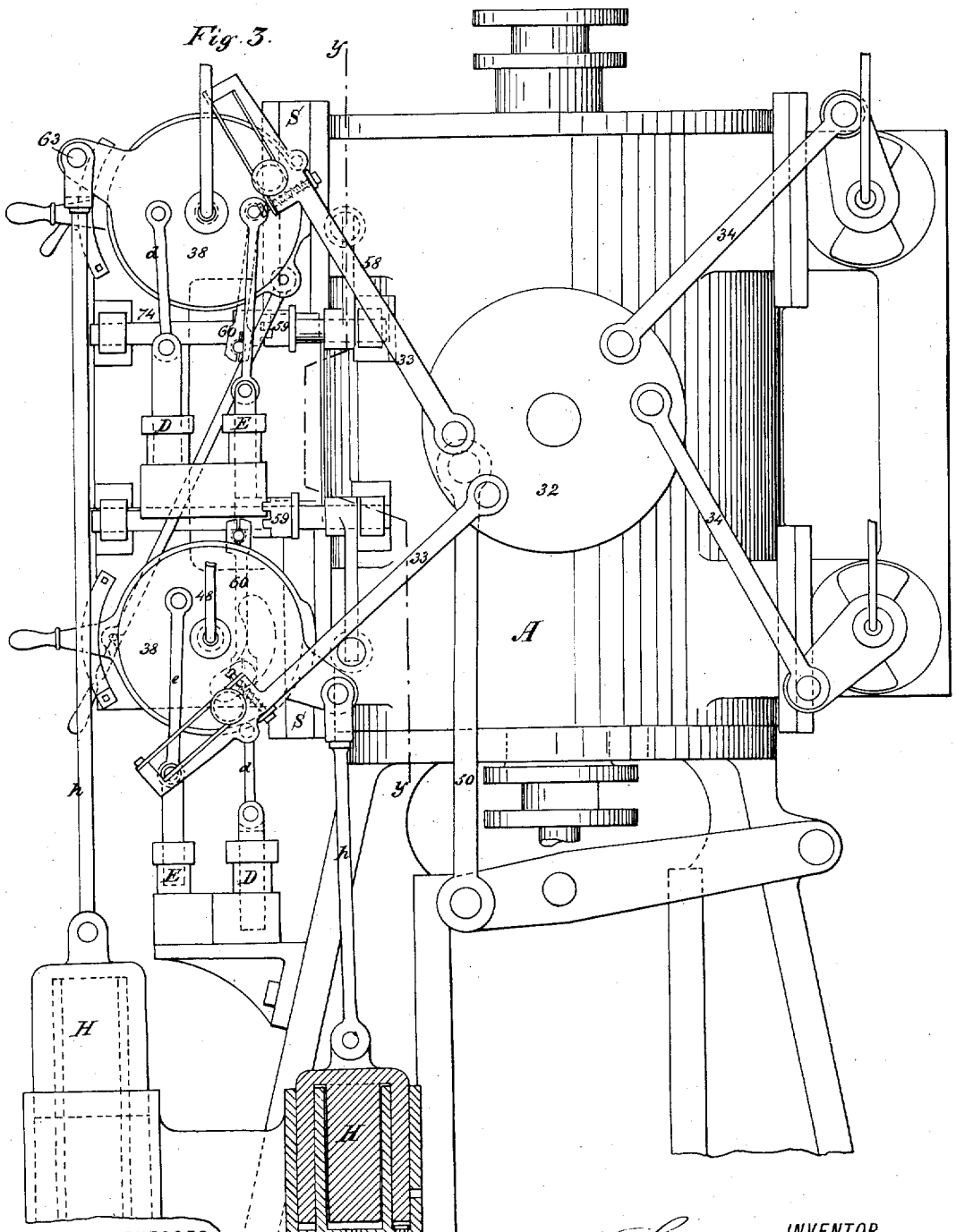

S. WILCOX.
AIR AND GAS ENGINE.
No. 10,750. Reissued July 27, 1886.
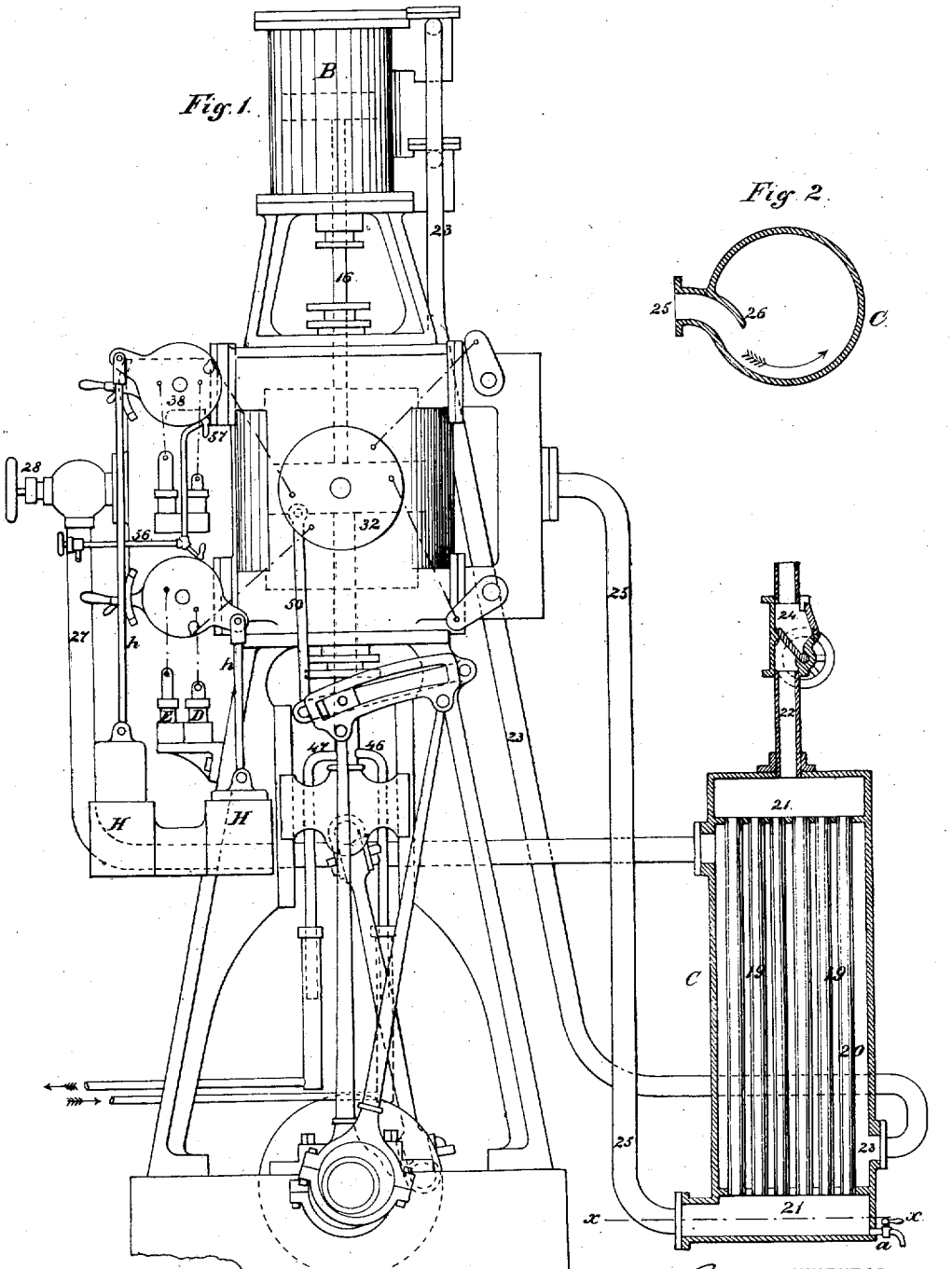
WITNESSES:
Aug. Greuling
W. W. Wentworth
INVENTOR
Stephen Wilcox
BY
Chas. N. Forbes
ATTORNEY

S. WILCOX.

AIR AND GAS ENGINE.

No. 10,750. Reissued July 27, 1886.

WITNESSES:
Aug. Loeling
W. W. Wilson

INVENTOR
Stephen Wilcox
BY
Chas. N. Forbes
ATTORNEY

S. WILCOX.
AIR AND GAS ENGINE.
No. 10,750. Reissued July 27, 1886.
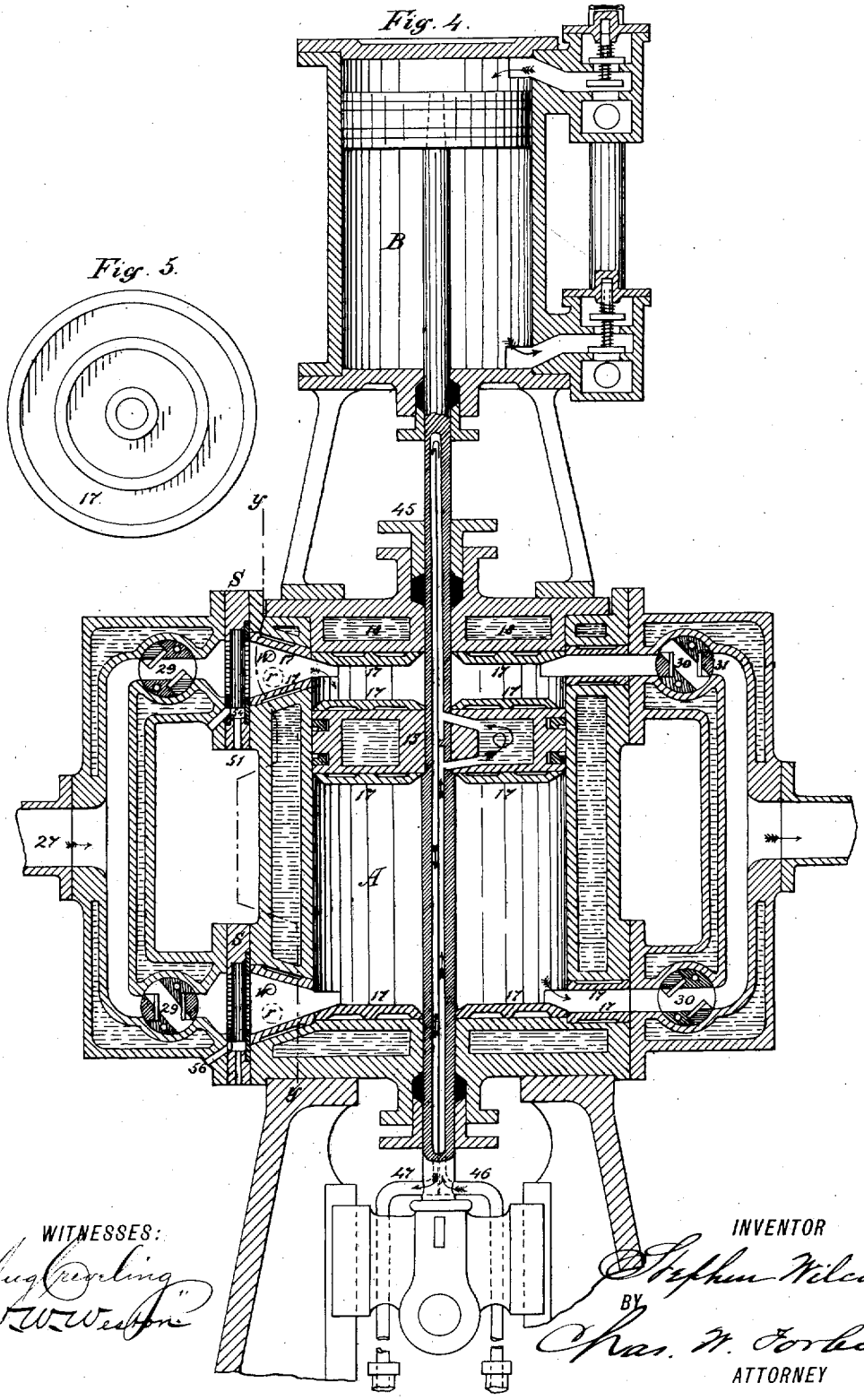
WITNESSES:
Aug. Greeling
W. W. Weston
INVENTOR
Stephen Wilcox
BY
Chas. H. Forbes
ATTORNEY

S. WILCOX.
AIR AND GAS ENGINE.
No. 10,750. Reissued July 27, 1886.
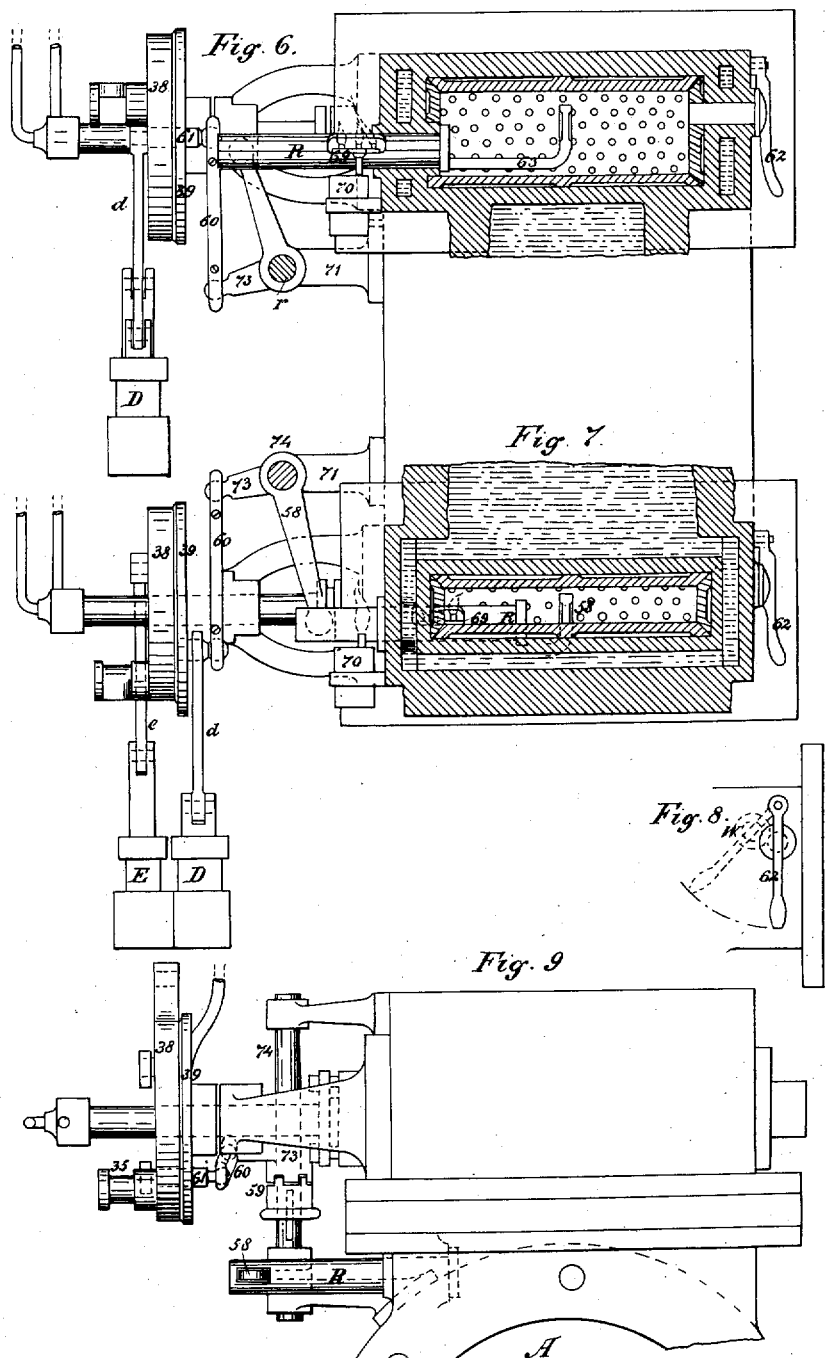
WITNESSES:
Aug Greeling
W. W. Westall
INVENTOR
Stephen Wilcox
BY
Chas F. Forbes
ATTORNEY

S. WILCOX.
AIR AND GAS ENGINE.
No. 10,750. Reissued July 27, 1886.
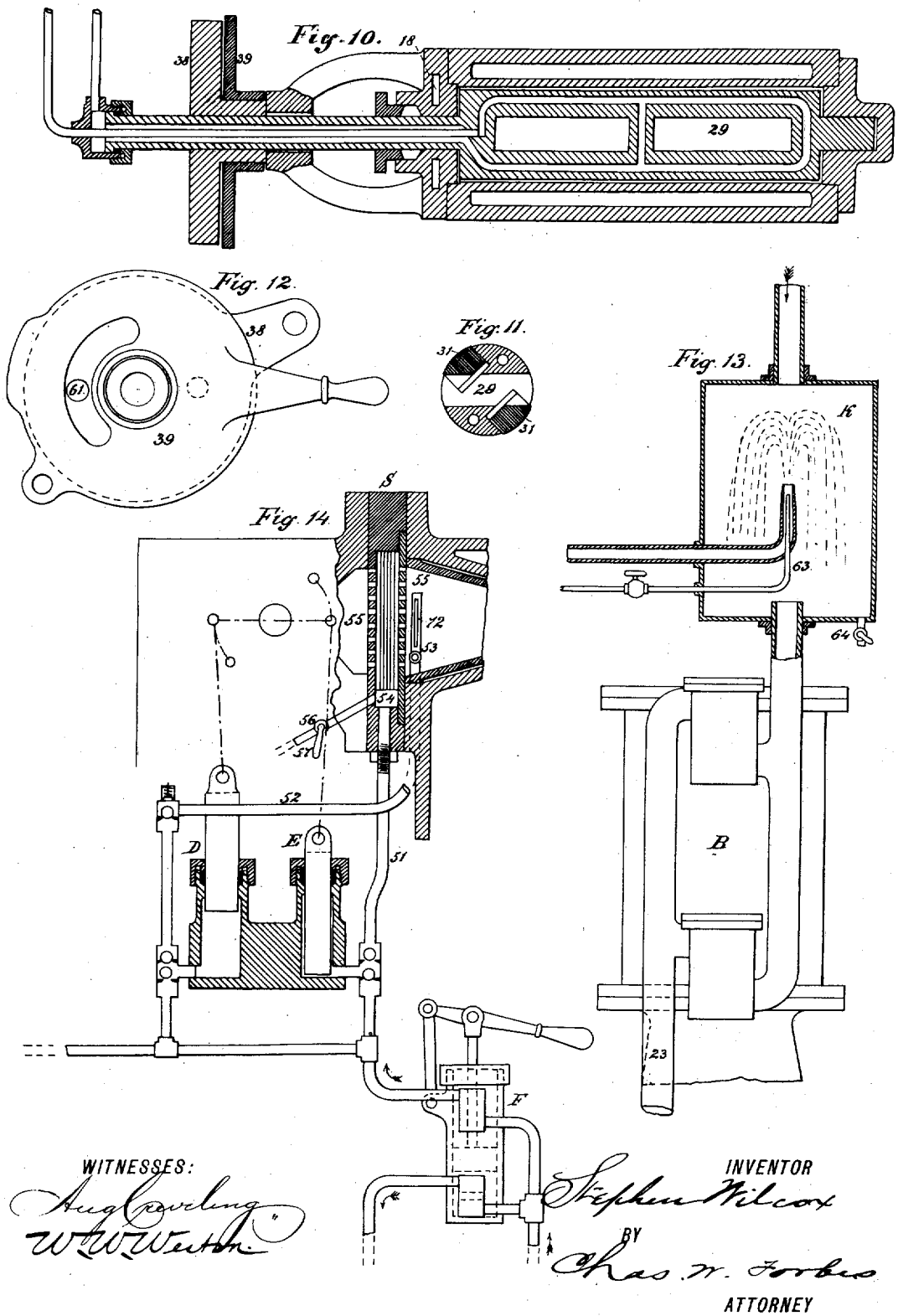
WITNESSES:
Aug Loveling
W. W. Weston
INVENTOR
Stephen Wilcox
BY
Chas. M. Forbes
ATTORNEY

UNITED STATES PATENT OFFICE.

STEPHEN WILCOX, OF BROOKLYN, NEW YORK.

AIR AND GAS ENGINE.

SPECIFICATION forming part of Reissued Letters Patent No. 10,750, dated July 27, 1886.

Original No. 332,312, dated December 15, 1885. Application for reissue filed May 26, 1886. Serial No. 203,310.

*To all whom it may concern:*

Be it known that I, STEPHEN WILCOX, a citizen of the United States, residing at Brooklyn, in the county of Kings and State of New York, have invented certain new and useful Improvements in Air and Gas Engines, of which the following is a specification.

The invention relates to that class of hot-air or gas engines in which an inflammable fluid is mixed with compressed air and fired in the working-cylinder.

The invention consists in heating the air preparatory to admission; charging the same with an inflammable fluid during or after the period of admission; in covering the internal surface of the cylinder-space and interior mechanism not in frictional contact with an imperfect conductor; in a novel construction and arrangement of the receiver, induction-valve, burner, and igniter; in the adaptation of a link-motion to operate and reverse the various operations, and in operating the charging device through the link-motion or a mechanism independent of said link-motion, all as hereinafter more particularly described, and the novel characteristics of the same referred to in the claims.

In order that others may understand and practice my invention, I will proceed to describe the same in connection with an upright inverted-cylinder engine. (Shown in the accompanying drawings.)

In Sheet 1, Figure 1 is a side elevation showing the general organization of the working parts of the engine and the receiver represented in vertical section, Fig. 2 showing a cross-section of the same on the line *x x*, Fig. 1. In Sheet 2, Fig. 3 represents a side elevation of the cylinder and enlarged details of the valve mechanism and connected operative parts. In Sheet 3, Fig. 4 is a central vertical section of the cylinder and adjacent valve-chests and air-pump; and Fig. 5, a detached view of one of the protecting-plates of the piston. In Sheet 4, Fig. 6 is a sectional view through the upper induction-port on the line *y y*, Fig. 4; and Fig. 7, a similar view through the lower induction-port on the line *y y*, Fig. 4. Fig. 8 is a detached face view of a lighting-orifice and cover, and Fig. 9 a plan view of Fig. 6. In Sheet 5, Fig. 10 is an enlarged vertical section of an induction valve and chest, and Fig. 11 a cross-section of the valve. Fig. 12 is an enlarged view of the operating wrist-plates attached to the valve-spindle. Fig. 13 is a side elevation of air-pump and connected attachment in section, for moistening the entering air; and Fig. 14, an enlarged view of the burner and connected charging-pumps.

The corresponding details of all the figures in the several sheets of drawings will be indicated by the same marks of reference.

A is the cylinder of a double acting engine, surrounded with a water-jacket to prevent overheating, fitted with a piston, 15, and provided with inlet and exhaust ports, precisely similar to the inverted cylinder of an upright steam-engine. The interior surfaces of the cylinder not in frictional contact, the surfaces of the piston exposed to the action of the ignited gases, and the port-surfaces are covered with an imperfect conductor, preferably in the form of a plate of cast-iron applied to such exposed parts, as represented at 17 in the sectional view, Fig. 4. The object of this plate or lining is to check conduction and confine the heat developed to as great a degree as possible with the process of combustion, and also to maintain so high a temperature in the plates as to materially lessen condensation on their surfaces and in the cylinder as to render practicable the use of heavy volatile oils as an inflammable, and yet preserve, in consequence of the water-jacket, such a low comparative temperature in the cylinder-walls as will permit the usual method of lubrication.

Other substances than cast or wrought iron may be employed as a material for the plate or lining referred to—such as fire-brick, soapstone, or graphite—but in practice danger would probably arise from disintegration of such substances under the violent fluctuations of both temperature and pressure to which they would be subjected, which would result in scratching the interior surfaces and valves. It is well known that the cold-water jacket, *per se*, causes serious loss by condensation; but by the interposition of these plates this difficulty is greatly overcome.

I have shown in Figs. 4 and 5 a representation of cast-iron plates provided with narrow ribs, which form bearing-surfaces with space between, as a preferred construction.

To otherwise modify the effect of the high temperature of the products of combustion, I employ the additional expedient of circulating cold water around and through all parts of the engine that by location are subject to the heat in the working-cylinder, and have extended such circulation to the interior of the piston and valves through their respective rods, return-passages being made by a partition plate, 45, (shown, for example, in the piston-rod in the enlarged sectional view, Fig. 4, the arrows indicating the course of the water,) and the connecting-pipes 46 47, leading to the circulating-pump.

From an inspection of Figs. 4, 6, 7, and 10 the arrangement of the water chambers and water-circulating pipes will be readily understood without further notice, except in relation to a new and advantageous result obtained in interposing a water-chamber between the piston rod or other stuffing-boxes adjacent to the cylinder to protect the packing from burning out, as shown at 18, Figs. 4 and 10. This adaptation in connection with the water circulation through the piston and valve rods will materially overcome one of the serious difficulties met in practice with this class of engine.

The receiver is represented at C, Figs. 1 and 2, Sheet 1, and made preferably in the form of a cylinder in capacity equal to the requirements of the air-supply without collecting more surplus than will sufficiently maintain a uniform maximum of pressure, and of sufficient strength to withstand a constant pressure of at least seventy five pounds to the square inch. Within this reservoir or receiver I arrange a series of tubes, 19, secured to the transverse tube-sheets 21, and communicating collectively with the exhaust-passage 25 of the engine and also with an escape-pipe, 22, leading to the atmosphere, through which the hot exhaust-gases pass. The reservoir or compressed-air chamber 20 of the receiver is connected with the delivery-pipe of the air-compressing pump at 23, and with the induction-pipe leading to the working-cylinder at 27, and through the successive strokes of the pump and engine a current is established and heated by the coincident passage of the exhaust-gases escaping through the tubes.

In the cross-sectional view, Fig. 2, an extension of the exhaust-pipe is carried into the receiver and curved, as shown at 26, in order to give a circular motion to the exhaust-gases, and to separate the liquid particles that may be carried in suspension. Such particles will be thrown against the shell of the receiver by the centrifugal action imparted to them, and will gravitate to the bottom chamber, from whence they may be drawn off by a discharge-cock, *a*. The receiver and cylinder may be furnished with a pressure-gage, safety-valve, and thermometer, or other expedients to indicate all prevailing conditions that may be desirable to determine.

The application of a heating device may be accomplished in other ways, the object sought being to elevate the temperature of the air previous to its contact with the inflammable liquid to be burned, in order by contact to make the latter limpid and render it more easily convertible into spray and volatilized, and which facilitates its combustion, and also renders practicable the use of heavy oils for this purpose.

The induction valves 29 are shown in cross-section in the sectional views, Figs. 4 and 11, and in longitudinal section in the enlarged view, Fig. 10. These valves are constructed in cylindrical form, with the ports or inlet-passages made directly through them, and are operated to cause said port to register with the induction-passage by an oscillating movement imparted through the wrist-plate 38 and rods 33, connected with the wrist-plate 32, that is vibrated by the rod 50, connected with the link-motion shown in Fig. 1. The portions of the circumferential bearing-surface of the valve that close the induction-passages are recessed and fitted with seats 31, Figs. 4 and 11, on both the cylinder and receiver side, in order to resist a preponderating pressure and prevent escape from either direction, that is liable to occur from the receiver into the cylinder when the cut-off is closed, or from the cylinder into the receiver when the pressure in the former is greatest. It will be observed that the valve-seats 31 are beveled inwardly to allow a direct and free passage when the valve is wide open or at full throw. The exhaust-valves 30 are of the same construction, and actuated by the wrist-plate 32 through the connecting-rods 34, similar to the induction-valves, except that the connection is permanent. The induction-valve mechanism is organized on the principle of that adopted in the Corliss engine, and which will be readily understood upon an inspection of the enlarged detailed view, Fig. 3, without referring more particularly to the numerous parts shown than in the explanation of the mode of operation hereinafter described.

The most important feature of the Corliss valve-gear, adopted in this engine, is the method of effecting the cut-off by liberating the catches which open the induction-valves and allow them to close instantaneously at any desired point of the stroke by an extraneous force, thereby avoiding the wire-drawing incident to a slow-closing cut-off. This feature is important to economy in a steam-engine, and is of much more importance in a gas-engine, where the ignition of the charge, after the closing of the cut-off, increases the pressure several fold, as under these conditions the effect of wire-drawing the initial charge is multiplied in the same ratio as the increase of pressure.

D E represent plunger-pumps for injecting the inflammable fluid, (shown in sectional detail in enlarged view, Fig. 14,) with connected suction and discharge pipes and valves. These pumps are of different capacity, and act independently at different times during the movement of the induction-valve. The smaller pump, E, is designed to supply the first and minimum quantity of the inflammable fluid during the opening movement of the induction-valve, and its connecting-rod *e* is attached in such position on the wrist-plate 38 as to produce the required throw, and to cause it to deliver during the first movement of said plate and corresponding opening movement of the valve. Its delivery-pipe 51 is directed to the vestibule-chamber 54 within the burner S, and the inflammable fluid is discharged into said chamber, and then finds its way into and through the meshes of the intervening wire-gauze by capillary attraction, where it remains suspended until forced through the perforated plates 55 by the current of the compressed air. In this view, Fig. 14, an auxiliary hand-pump, F, is also shown connected to the delivery-pipe of pump E to discharge a small quantity of the inflammable fluid to charge the burner preparatory to starting the engine, and to anticipate the automatic action of the pump E. The larger pump, D, is designed to deliver the maximum quantity of the inflammable fluid, and is connected to the valve wrist-plate 38 at such position as to act during the reverse movement of said plate and consequent closing movement of the valve. Its delivery-pipe 52 leads to the ignition chamber beyond the burner S, and projects some distance across the face of the burner, an elongated slot, 72, being made to discharge the inflammable fluid in sheet form. The burner S is located at the side of the cylinder across the induction port, and secured between the adjoining flanges of the cylinder and valve-box nozzles, which facilitates its removal without disturbing other parts of the engine. The induction-passage at this part is enlarged, as shown in the sectional views, Figs. 4 and 14, to obtain sufficient area of surface in the burner and room for the introduction of the igniting devices. The burner consists of a series of sheets of wire-gauze clamped between perforated metal plates 55, Fig. 14, and secured between the cylinder and induction-nozzle flanges.

A firing port, W, Figs. 4, 6, 7, 8, provided with a cover, 62, serves for the introduction of a torch for lighting the burner when the engine is at rest, and to prevent the torch from being extinguished at this time by the natural draft through the exhaust-passages a valve, 24, Fig. 1, is placed in the escape-pipe 22, that may be closed. This valve 24, when closed, is arranged at an inclination, as shown, and will be forced open by the action of the exhaust, should the operator neglect to open it before the engine is set in motion. The automatic igniter consists in a reciprocating tube, R, Figs. 6, 7, and 9, operated in a port, *r*, and located between the burner and cylinder, Fig. 4, and carrying a lamp, 69, its flame passing through a slot in the tube R, as shown in Figs. 6 and 7. The tube is reciprocated simultaneously with the valve-motion, to which its operative parts are connected, such parts being adjusted to bring the flame of the lamp 69 in contact with the admitted air and inflammable fluid coincident with the closing or cut-off of the induction-valve at whatever portion of the stroke the induction valve may be set to close. The flame of this lamp is not constant, owing to its rapid reciprocation through its entering-port, when it is liable to be extinguished; consequently another lamp is located outside, so that its flame is in the path of the movable lamp, and at each entering movement of the latter flame is communicated and carried to the interior.

The mechanism for operating the tube R is shown in the enlarged views, Sheet 4, and consists in a bell-crank that passes into a slot in the tube, consisting in fixed arms 58 and 73 on the rock-shaft 74, the arm 73 being connected through the rod 60 with the wrist-pin 61 on the wrist-plate 38, that operates the induction-valve, ball-and-socket joints being shown in the connection as one of many known means of conveying such indirect movements. The arm 73 is loose on the rock-shaft 74, and may be disconnected by disengaging the clutch 59, Fig. 9, when the igniter is not required.

The air-compressing pump is shown at B, Figs. 1, 4, and 13, mounted upon the cylinder and furnished with a piston attached to a continuation of the cylinder piston-rod. This air-pump is supplied with a proper induction and exhaust valve of any preferred construction and arrangement, and may also be connected with an auxiliary chamber for saturating the entering air with a water-jet, (shown in section, Fig. 13,) the water being admitted through the pipe *x* and air from the receiver through the smaller pipe 63, which will discharge the jet in the form of spray.

It is well known that dry air compressed to a great degree will indicate a high temperature, but when saturated with moisture the temperature is reduced under the same degree of compression. Therefore the adaptation of a device to carry out such a reduction in temperature will be found of prime importance in this class of engines in keeping the air-pump cool, in increasing the capacity of the air to absorb a greater amount of the heat of the exhaust-gases, and in improving its quality for promoting combustion in the cylinder.

In the operation of the engine the receiver is first charged with air by a small hand pump or other similar device to a degree of compression sufficient to force a small quantity of air into the burner to start the process of combustion, a small inlet pipe, 56, fitted with one or more stop-cocks, 57, Figs. 1 and 14, being especially provided for such purpose. The hand-pump F, Fig. 14, is also operated a few strokes to inject a portion of the inflammable fluid into the burner through the pump delivery-pipe 54, when it mingles with the current of entering air, and is carried through the perforated plate 55 in the form of spray. The valve 24 in the escape-pipe 22, Fig. 1, is closed to shut off the natural draft through the engine, and a lighted torch applied to the burner through the port W, which produces a tranquil flame over the surface of the burner. The engine is now started by opening the main stop-valve 28, Fig. 1, to admit the full current of air, and the automatic action of the several operative parts commences. The air from the receiver, passing through the burner, takes up the inflammable fluid injected into the meshes of the wire-gauze and carries it through the same, when the mixture ignites and the process of combustion already begun is continued. It will be understood that if all the air is fully saturated with combustible spray as it passes into the working cylinder it will burn as fast as it enters, and no greater pressure is obtained than that in the receiver, and the air pump will consequently work against the highest pressure on the piston; but in delaying a portion of the combustion until after the cut-off occurs a higher pressure is created in the cylinder. Therefore, during the opening movement of the induction-valve only such a quantity of the inflammable is admitted to the burner that will saturate a portion of the entering air sufficient to support the flame and elevate the temperature of the air to a degree at which it will more readily combine with the remaining portion that enters during the closing movement of the induction-valve, which in practice generally takes place when the cylinder-piston has completed about one-sixth of its stroke. The small charging pump E commences to deliver simultaneously with the opening of the induction-valve, and ceases to act at whatever point the valve begins to close. The arm that actuates this pump has an increasing leverage, and its rate of delivery nearly corresponds to the speed of the piston and following velocity of current. The larger charging-pump D delivers during the closing or cut-off movement of the induction-valve, and supplies the remainder of inflammable at the latest moment possible, when it is carried by a strong current into the cylinder and mixed with the preceding air. The arm that actuates this pump has a decreasing leverage, and the pump commences to deliver at the greatest leverage of said arm, so that the greatest quantity of inflammable is supplied with the strongest current.

The differential leverage of the respective actuating-arms referred to is clearly shown in Fig. 14.

When the stop-cock 57 is opened, and a small stream of air is allowed to flow in contact with the oil in the burner and become inflammable, and is ignited through port W, it will continue to burn after the engine is started and maintain a constant torch, igniting the fuel as fast as it passes the burner. As a portion of the fuel is delivered to the burner just before the cut-off closes, and is carried into the cylinder to find its equivalent of air, so much of the combustion as occurs after the cut-off closes tends to raise the cylinder-pressure above the receiver-pressure, thereby increasing the power of the engine without adding to the load on the pump.

Another method of operating the engine is as follows: When the engine is running and cutting off, if the stop-cock 57 be closed the torch is extinguished, and the air and fuel will pass into the cylinder uninflamed; but if clutch 59 be thrown into gear the igniter is put in action, thereby inflaming the imprisoned charge just as the cut-off closes, and which raises the pressure several fold. This is the generally-preferred method of operation. When, however, it is desired to run the engine slow, or to reverse it, if the stop-cock 57 be opened again the torch or burner will be lighted by the igniter, and if the cut-off be lengthened and the throttle properly adjusted such an uniform pressure will be maintained that will enable the attendant to easily handle the engine. If the engine be stopped for a short time, the torch is liable to go out, but will be relighted by the igniter when the engine starts.

The cut-off or closing action of the induction-valve will be readily understood upon inspection of Fig. 3, the air-check H, with its central vacuum-chamber (shown in elevation and section) connecting, respectively, with the projecting arms 63 on the valve wrist plate 38, being a well-known expedient for this purpose, and its operation very generally understood. In relation to the cut-off feature, it will also be understood that it can be directly and positively accomplished through the adjustment of the link-motion independent of the tripping mechanism.

Having thus fully described my invention and referred to certain instrumentalities sufficiently to enable others to practice the same, I wish it to be understood that I do not abandon nor confine myself to the use of the particular devices herein shown in the performance of the methods set forth, such instrumentalities, particularly in detail, being susceptible of various changes without departing from the spirit of the invention. Therefore,

What I claim, and desire to secure by Letters Patent, is—

1. The combination, with a gas-engine in which compressed air is admitted to the working-cylinder and fired, of a charging device for saturating the air with an inflammable liquid, a variable cut-off valve, and an igniter to inflame the charge, capable of adjustment, to act coincident with the closing of said cut-off valve.

2. In combination with an air or gas engine in which combustible gases are fired in the working-cylinder, a charging device for injecting an inflammable fluid, operated and adjusted, substantially as described, to deliver said inflammable fluid at the latest movement of the induction-valve, so that mixture with the admitted air takes place within the cylinder coincident with or subsequent to the closing of said valve.

3. In combination with an air or gas engine in which combustible gases are fired in the working-cylinder, a charging device for injecting an inflammable fluid, operated and adjusted, substantially as described, to deliver a small quantity of the same during the opening movement of the induction-valve, and to rapidly deliver a greater quantity or full supply during the closing movement of said valve, whereby the greater quantity of inflammable fluid entering the cylinder at the latest movement of the valve is mixed with the preceding air admitted within the cylinder subsequent to the closing of said valve.

4. In combination with an air or gas engine in which combustible gases are fired, two charging-pumps operated by a mechanism of differential movement, one of said pumps being adjusted to deliver a small quantity of inflammable fluid during the opening movement of the induction-valve, and the other pump adjusted to rapidly deliver a greater or full supply during the closing movement of said valve, whereby the greater quantity of inflammable fluid entering the cylinder at the latest movement is mixed with the preceding admitted air after the induction-valve closes.

5. A receiver for air or gas engines, provided with a series of internal tubes connected with the exhaust pipe or passages of the working-cylinder, the air-space communicating with the delivery of the air-compressing pump and directly with the induction-passage of the working-cylinder, whereby said tubes serve to heat the passing current of compressed air and as stays to strengthen the construction.

6. A working-cylinder or valve-chest head for gas-engines, made hollow and fitted with stuffing-boxes and hollow piston or valve rods, said hollow head forming a water space or jacket between the cylinder and stuffing-box, whereby the packing is kept cool and protected from burning by an escape of the hot gases around said rods.

7. In combination with an air or gas engine in which combustible gases are fired in the working-cylinder, an induction-valve adapted to be disconnected from its opening mechanism at any desired part of the stroke and suddenly closed by an independent auxiliary device, and a charging-pump for injecting an inflammable fluid operating coincident with the closing movement of said valve.

8. The combination, with a gas-engine in which compressed combustible gases are fired in the working-cylinder, of an induction-valve opened by a positive motion and adapted to be closed at any desired point of the stroke by an extraneous force, and an igniter acting coincident with the closing of said induction-valve.

9. A double-seated induction-valve located between the receiver and cylinder, to close the communication and resist the action of a preponderating pressure from either direction.

10. An induction-valve of the type or kind described, having its port extended directly through it, and its circumferential faces fitted to close the communication between both the cylinder and receiver, and to be cooled by exposure to the adjacent water-jacket when in an open position.

11. The combination, with a gas-engine in which compressed combustible gases are fired in the working-cylinder, of independent induction and eduction valves protected by water-jackets, the induction-valves adapted to resist pressure toward and from the cylinder, and to cut off at variable points of the stroke, and an igniter adapted to inflame the charge coincident with the closing of the cut-off.

12. The combination, with a gas-engine in which compressed combustible gases are fired in the working-cylinder, of a valve-gear for positively operating independent induction and eduction valves, the induction-valves being adapted to close at variable points of the stroke, and an igniter acting coincident with the closing of the induction-valve, as set forth.

13. The combination, with a gas-engine in which compressed combustible gases are fired in the working-cylinder, of independent induction and eduction valves protected by water-jackets, the induction-valves adapted to resist pressure toward and from the cylinder and capable of adjustment to cut off at variable points of the stroke, and a reversing-gear for running the engine in either direction.

14. An air or gas engine having its burner secured between the nozzles or flanges of the working-cylinder and valve-box, whereby it may be easily removed and replaced without disturbing other parts of the engine.

15. An air or gas engine provided with a sliding igniter operated by a motion coincident with the valve-motion, and having its inclosing-port between the burner and cylinder, whereby it is sure to encounter and fire the issuing vapor, and made capable of adjustment, to act simultaneously with the closing of the cut-off at any desired point of the stroke.

16. A double-acting air or gas engine in which atmospheric air and an inflammable fluid are mixed and fired in successive charges, consisting of a working-cylinder, an air-compressing pump, a reservoir containing atmospheric air under pressure, arranged between said pump and cylinder, and a charging device for injecting an inflammable fluid, said cylinder being fitted with suitable induction and exhaust valves, combined with a link-motion for operating and reversing the same, and also operating said charging device.

17. A doubling-acting air or gas engine in which atmospheric air and an inflammable fluid are mixed and fired in successive charges, consisting of an air-compressing pump, a reservoir containing atmospheric air under pressure, arranged between said pump and cylinder, and a charging device for injecting an inflammable fluid, said cylinder being fitted with suitable induction and exhaust valves, combined with a link-motion for operating and reversing the same, and the charging device operated by mechanism independent of said link-motion.

18. An engine in which the agent of force is saturated, air fired in successive charges in the working-cylinder, provided with an air-compressing pump, a reservoir or receiver for containing air under compression, and a device for saturating the air with an inflammable fluid, the working-cylinder of said engine having suitable induction and exhaust valves, the induction-valve being adjusted to open to admit air separately or with an inflammable fluid in such measured quantity to saturate a portion of the accompanying air, to close at a predetermined period of each stroke, and during said closing movement to admit the required remaining portion of air and inflammable fluid, or the entire required supply of inflammable fluid separately, whereby a complete saturation of the air and inflammable fluid is delayed to take place within the working-cylinder coincident with or subsequent to the closing of said induction-valve.

19. In combination with an air or gas engine in which combustible gases are fired, a moistening receptacle or chamber with interior spraying attachment arranged to saturate the entering air preparatory to compression, for the purposes explained.

STEPHEN WILCOX.

Witnesses:

CHAS. W. FORBES,

AUG. CREVELING.